United States Patent [19]

Ohnishi et al.

[11] Patent Number: 4,990,835
[45] Date of Patent: Feb. 5, 1991

[54] AUTOMOTIVE MOTOR-DRIVEN DEVICE CONTROLLING AND DRIVING SYSTEM

[75] Inventors: Kazumasa Ohnishi, Nagaoka; Tadao Noguchi, Iwaki, both of Japan

[73] Assignee: Alps Electric Co., Ltd., Tokyo, Japan

[21] Appl. No.: 514,905

[22] Filed: Apr. 26, 1990

[30] Foreign Application Priority Data

Jun. 27, 1989 [JP] Japan ................................ 1-164580

[51] Int. Cl.⁵ .............................................. H02N 2/00
[52] U.S. Cl. ..................................... 318/116; 318/118; 310/317
[58] Field of Search ............. 318/116, 118, 119, 135; 310/316, 317, 318, 320, 323, 328; 331/116 R, 173

[56] References Cited

U.S. PATENT DOCUMENTS

| | | | |
|---|---|---|---|
| 3,889,166 | 6/1975 | Scurlock | 318/116 |
| 3,951,000 | 4/1976 | Ferriss et al. | 318/116 X |
| 3,975,650 | 8/1976 | Payne | 318/116 X |
| 4,056,761 | 11/1977 | Jacoby et al. | 318/116 |
| 4,257,103 | 3/1981 | Suzuki et al. | 318/562 X |
| 4,289,997 | 9/1981 | Jung et al. | 318/49 X |
| 4,774,441 | 9/1988 | Toyomasu et al. | 318/54 X |

FOREIGN PATENT DOCUMENTS 57-42205  3/1982  Japan ................................ 310/318
63-11070  1/1988  Japan .

*Primary Examiner*—Bentsu Ro
*Attorney, Agent, or Firm*—Guy W. Shoup; Paul J. Winters

[57] ABSTRACT

An automotive motor-driven device controlling and driving system for controlling and driving the respective ultrasonic linear motors of a plurality of automotive motor-driven devices, such as power seats, power windows and power antenna. The automotive motor-driven device controlling and driving system comprises a power circuit connected to the battery of an automobile, a single ultrasonic oscillator, a plurality of power amplifiers having input terminals connected to the power circuit and the ultrasonic oscillator, and output terminals connected through motor control switches to the ultrasonic linear motors, respectively, and a control unit for controlling the power circuit, the ultrasonic oscillator and the power amplifiers.

1 Claim, 3 Drawing Sheets

4,990,835

AUTOMOTIVE MOTOR-DRIVEN DEVICE CONTROLLING AND DRIVING SYSTEM

BACKGROUND OF THE INVENTION

1. Field of the Invention

The present invention relates to an automotive motor-driven device controlling and driving system for controlling and driving a plurality of automotive motor-driven devices.

2. Description of the Prior Art

Recent automotive motor-driven devices, such as front and rear power window regulators, employ, as driving means, silent, compact, lightweight ultrasonic linear motors, which generate neither mechanical noise nor electromagnetic noise. A driving circuit for driving an ultrasonic linear motor must be provided with an ultrasonic oscillator and a power amplifier for amplifying the output power of the ultrasonic oscillator. Necessarily, the ultrasonic linear motors of a plurality of motor-driven devices are connected individually to driving circuits. Such a circuit configuration, however, entails increase in the number of component parts and cost.

SUMMARY OF THE INVENTION

Accordingly, it is an object of the present invention to provide an automotive motor-driven device controlling and driving system for controlling and driving a plurality of ultrasonic linear motors, comprising a single control unit for controlling the ultrasonic linear motors.

In one aspect of the present invention, an automotive motor-driven device controlling and driving system for controlling and driving the ultrasonic linear motors, each comprising an elastic vibratory member and a vibration element attached to the vibratory member and capable of producing driving force by vibration produced by combining longitudinal vibration and flexural vibration produced at the extremity of the vibratory member by the vibration element, of a plurality of automotive motor-driven devices comprises: a single ultrasonic driving unit comprising an ultrasonic oscillator and power amplifiers for amplifying the output power of the ultrasonic oscillator, and connected through motor control switches to the ultrasonic linear motors; and a control unit for controlling the ultrasonic driving unit.

The automotive motor-driven device controlling and driving system of the present invention controls and drives a plurality of ultrasonic linear motors for driving automotive motor-driven devices. The use of the ultrasonic linear motors prevents radio disturbance by electromagnetic noise. Since the operating noise of the vibratory members of the ultrasonic linear motors are very low, the interior of the passenger compartment of the automobile is held on a low noise level.

Furthermore, since the plurality of linear motors are driven by the single ultrasonic oscillator, the driving circuit is simplified, the number of parts is reduced and the automotive motor-driven device controlling and driving system can be manufactured at a reduced cost.

BRIEF DESCRIPTION OF THE DRAWINGS

The above and other objects, features and advantages of the present invention will become more apparent from reading the following description taken in connection with the accompanying drawings, in which.

DETAILED DESCRIPTION OF THE PREFERRED EMBODIMENT

An automotive motor-driven device controlling and driving system 30 in a preferred embodiment according to the present invention will be described hereinafter with reference to the accompanying drawings.

The automotive power-driven device controlling and driving system 30 is described as applied to controlling and driving power window units.

Figure 2:
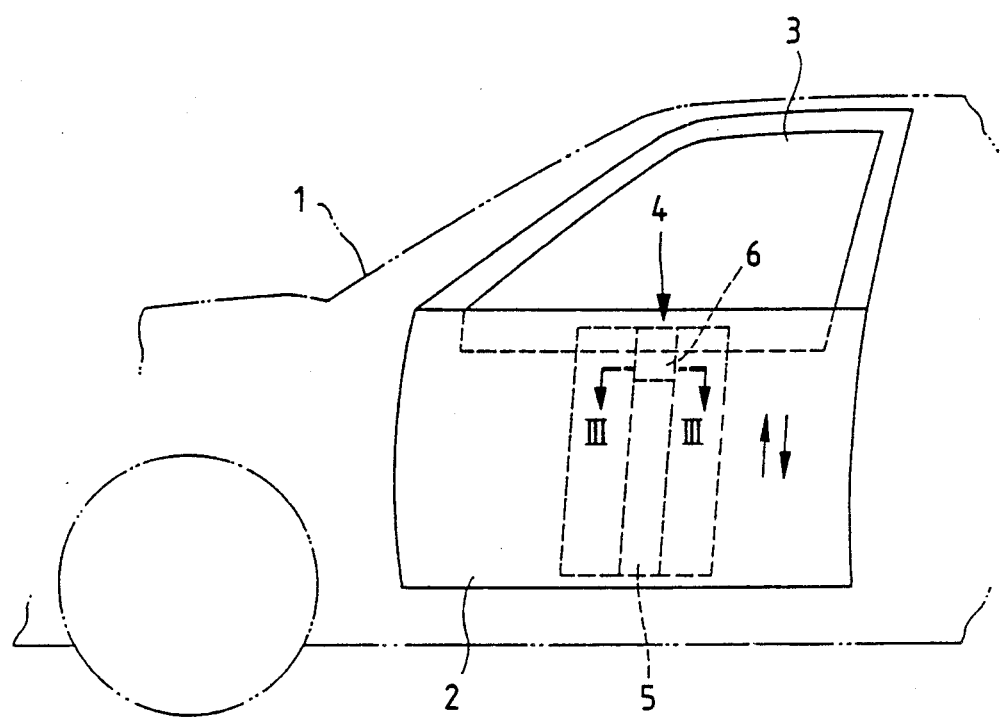
FIG. 2 is an illustration showing a power window unit on a front door of an automobile.

Referring to FIG. 2, there are shown a body 1, a front door 2, a front window glass 3, and a front window regulating unit 4. The front window glass 3 is guided for vertical movement by a guide mechanism, not shown, such as having guide rails provided with guide grooves or a linkage capable of raising and lowering the front window glass 3 in a predetermined position, provided within the front door 2. The front window regulating unit 4 has a guide rail 5 vertically extended within the front door 2. An ultrasonic linear motor 10, such as proposed by the applicant of the present patent application in U.S. Pat. application Ser. No. 07/282,761, is provided within the guide rail 5 and has a moving unit guided for substantially vertical movement by the guide slot 5a of the guide rail 5 to move substantially vertically a holder 6 attached to the lower end of the front window glass 3.

The ultrasonic linear motor 10 has a substantially U-shaped vibratory member 14 consisting of a pair of parallel legs 11 and 12, and a connecting part 13 interconnecting the parallel legs 11 and 12. Suitable material for forming the vibratory member 14 are metallic materials including aluminum, duralumin, iron, brass and stainless steels, inorganic materials including alumina, glass and silicon carbide, and organic materials including polyimide resins and polyamide resins. In this example, the legs 11 and 12 are 5 mm sq.×15 mm long, the connecting part 13 is 5 mm sq.×26 mm long and the vibratory member 14 is formed of aluminum.

The opposite edges of the vibratory member 14 are chamfered to form chamfers 15. Piezoelectric elements 16 and 17, i.e., vibratory elements, are attached adhesively to the chamfers 15 with an adhesive or the like. The piezoelectric elements 16 and 17 are stacked piezoelectric actuators or piezoelectric ceramic plates. When alternating current is supplied to the piezoelectric elements 16 and 17, the piezoelectric elements 16 and 17 generates ultrasonic vibrations vibrating in a direction perpendicular to the corresponding chamfers 15. The size of the piezoelectric elements 16 and 17, similarly to those of the legs 11 and 12, is determined selectively. In this example, the size of the piezoelectric elements 16 and 17 is 5 mm sq.×9 mm long.

Figure 3:
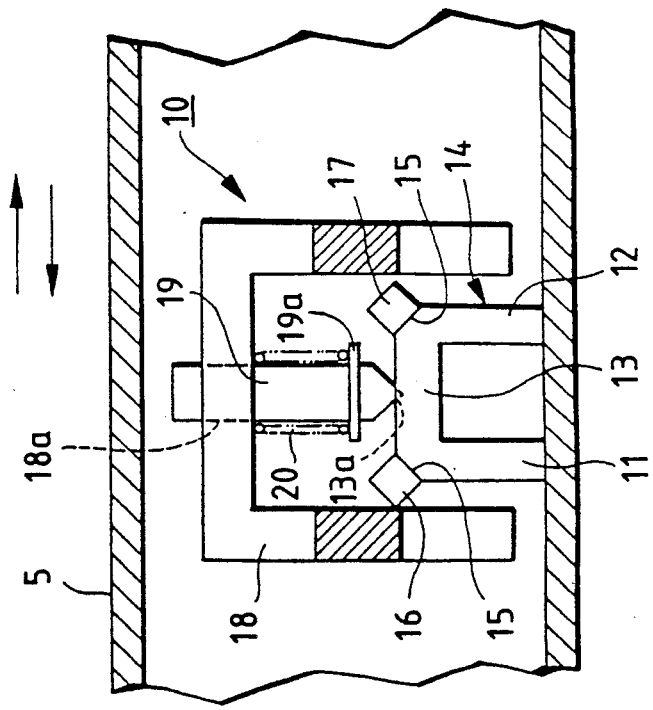
FIG. 3 is a sectional view taken on line III—III in FIG. 2.
Figure 4:
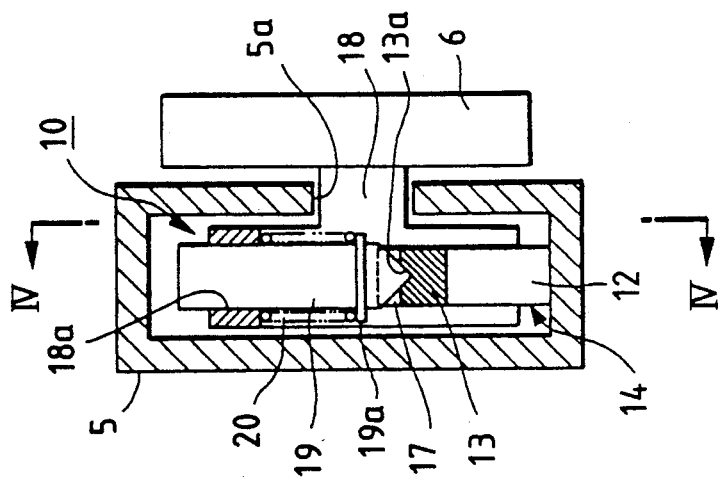
FIG. 4 is a sectional view taken on line IV—IV in FIG. 3.

The vibratory member 14 is disposed within the guide rail 5 with the extremities of the legs 11 and 12 respectively in contact with the inner side surface of the guide rail 5. A slider 18 slides along the guide slot 5a of the guide rail, and a holder 6 is attached to the slider 18. A through hole 81 is formed in the central portion of the upper section of the slider 18, and a pin 19 having a conical point is fitted in the through hole 18a for vertical sliding movement, as viewed in FIG. 3. A compression spring 20 is compressed between a flange 19a formed near the conical point of the pin 19 and the slider 18 to bias the pin 19 continuously downward, as viewed in FIG. 3, to fit the conical point of the pin 19 in a recess 13a formed in the central portion of the upper surface of the connecting part 13 of the vibratorY member 14, so that the extremities of the legs 11 and 12 of the vibratory member 14 is pressed against the inner side surface of the guide rail 5 by a predetermined force.

The vibratory member 14 is vibrated by applying an alternating voltage of a ultrasonic frequency to either the piezoelectric element 16 or 17 or to both the piezoelectric elements 16 and 17 to generate an elliptic rotating vibration (ring vibration) rotating in a specific direction, i.e., a resultant vibration of a longitudinal vibration and a flexural vibration, at the extremities of the legs 11 and 12. Then, the vibratory member 14 moves together with the slider 18 and the holder 6 in the direction of rotation of the elliptic rotating vibration. The phase of the alternating voltage applied to the piezoelectric elements 16 and 17 is changed to change the direction of movement of the holder 6 by changing the direction of rotation of the elliptic rotating vibration. Thus, the holder 6 is raised or lowered along the guide rail 5 to raise or lower the front window glass 3 by controlling the operation of the ultrasonic linear motor 10.

Figure 1:
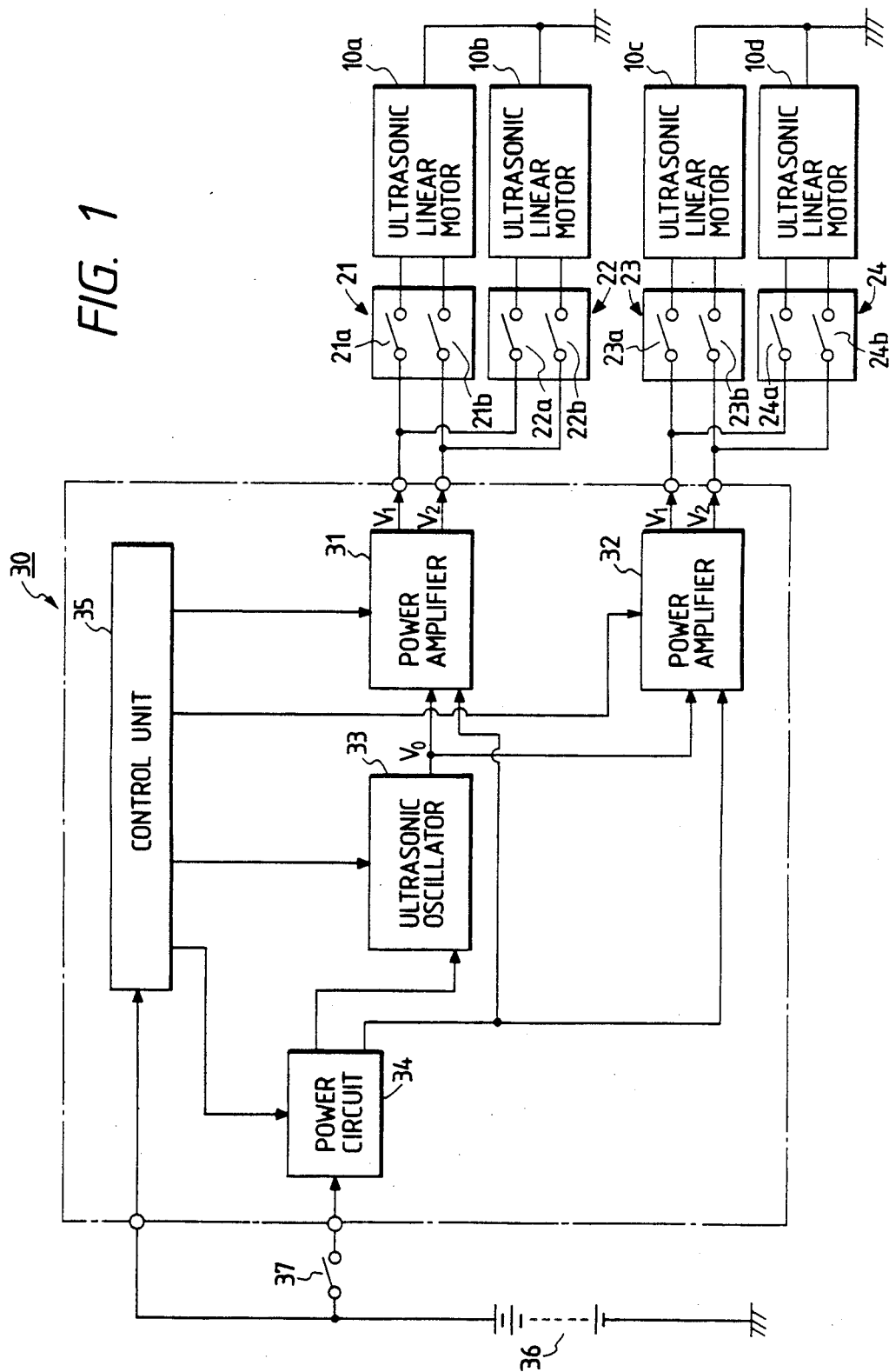
FIG. 1 is a block diagram of an automotive motor-driven device controlling and driving system in a preferred embodiment according to the present invention.

Referring to FIG. 1, the automotive motor-driven device controlling and driving system 30 controls and drives the respective ultrasonic linear motors 10a and 10b of front right and left power window units, and the respective ultrasonic linear motors 10c and 10d of rear right and left power window units. The ultrasonic linear motors 10a and 10b are connected through motor control switches 21 and 22 to the output terminals of a first power amplifiers 31, and the ultrasonic linear motors 10c and 10d are connected through motor control switches 23 and 24 to the output terminals of a second power amplifier 32. The first power amplifier 31 and the second power amplifier 32 are connected to the output terminals of an ultrasonic oscillator 33. The power amplifiers 31 and 32 amplifies the output voltage V0 having an ultrasonic frequency of the ultrasonic oscillator 33 to apply a first alternating voltage V1 or a second alternating voltage V2 to the ultrasonic linear motors 10a, 10b, 10c and 10d. The respective phases of the alternating voltages V1 and V2 are different from each other and are dependent on the direction of driving the ultrasonic linear motors 10a, 10b, 10c and 10d. The first alternating voltage V1 is a raising voltage for driving the ultrasonic linear motors 10a, 10b, 10c and 10d in raising the corresponding window glasses, and the second alternating voltage V2 is a lowering voltage for driving the ultrasonic linear motors 10a, 10b, 10c and 10d in lowering the corresponding window glasses. The first alternating voltage V1 is applied to the ultrasonic linear motors 10a, 10b, 10c and 10d when the contacts 21a, 22a, 23a and 24a of the corresponding motor control switches 21, 22, 23 and 24 are closed. The second alternating voltage V2 is applied to the ultrasonic linear motors 10a, 10b, 10c and 10d when the contacts 21b, 22b, 23b and 24b of the corresponding motor control switches 21, 22, 23 and 24 are closed.

A power circuit 34 applies a supply voltage to the first power amplifier 31, a second power amplifier 32 and the oscillator 33. A control unit 35 controls the power amplifiers 31 and 32, the oscillator 33 and the power circuit 34. The control unit 35 is connected to the battery 36 of the automobile, and the power circuit 34 is connected through an ignition switch 37 to the batterY 36.

The operation of the automotive motor-driven device controlling and driving system 30 will be described hereinafter.

In raising the window glass by the ultrasonic linear motor 10a of the front left power window unit, the ignition switch 37 is closed, and then the contact 21a of the motor control switch 21 is closed. Consequently, the oscillator 33 is actuated and the first power amplifier 31 applies the first alternating voltage V1 to the ultrasonic linear motor 10a, whereby the ultrasonic linear motor 10a raises the window glass while the contact 21a is closed. In lowering the window glass by the ultrasonic linear motor 10a, the contact 21b of the motor control switch 21 is closed. Then, the oscillator 33 is actuated and the first power amplifier 31 applies the second alternating voltage V2 to the ultrasonic linear motor 10a. The ultrasonic linear motor 10a lowers the window glass while the contact 21b is closed.

The other ultrasonic linear motors 10b, 10c and 10d are controlled and operate similarly by operating the motor control switches 22, 23 and 24 to raise or lower the corresponding window glasses. Incidentally, the ultrasonic linear motors 10a, 10b, 10c and 10d do not generate any electromagnetic noise which may cause radio disturbance, and operate very silently because the vibrations of the vibratory members 14 are in an ultrasonic frequency range.

The legs 11 and 12 of the vibratory member 14 need not necessarily be parallel to each other, the vibratory member 14 may be provided with three or more legs, and the connecting part may be formed in a curved shape.

The automotive motor-driven device controlling and driving system 30 is applicable also to controlling and driving the ultrasonic linear motors of other automotive motor-driven devices. In such a case, the automotive motor-driven device controlling and driving system 30 is provided with additional power amplifiers, but in any case, the automotive motor-driven device controlling and driving system 30 needs only a single oscillator 33.

The automotive motor-driven device controlling and driving system is applicable to controlling and driving ultrasonic linear motors for the seat positioning unit of a power seat, the accelerator holding unit of an automatic cruise controller, a slide wiper, the driving unit of a door mirror, the driving unit of a motor-driven curtain, the driving unit of an automatic spoiler, the driving unit of a retractable head light, a solenoid valve, the driving unit of a window washer system, the driving unit of a slide door, the driving unit of a sunshine roof, and the driving unit of a head rest.

For some ultrasonic linear motors, the automotive motor-driven device controlling and driving system may be constructed so as to detect the switching mode of the motor control switch and to generate the alternating voltage V1 or V2 continuously for a predetermined time when the motor control switch is operated momentarily.

The ultrasonic linear motors may be driven sequentially according to order of priority to avoid excessive increase in load due to the simultaneous operation of the plurality of ultrasonic linear motors. When instructions respectively for actuating the plurality of ultrasonic linear motors are given simultaneously, the timing of application of the alternating voltages V1 and V2 to the ultrasonic linear motors may be determined according to predetermined order of priority.

The automotive motor-driven device controlling and driving system 30 for the centralized control of the ultrasonic linear motors may be disposed at any suitable position on the automobile and need not be disposed in the vicinity of the ultrasonic linear motors.

As is apparent from the foregoing description, the automotive motor-driven device controlling and driving system in accordance with the present invention is provided with a single ultrasonic oscillator for controlling and driving all the ultrasonic linear motors of the automotive motor-driven devices, an hence is simple in construction, inexpensive and requires a reduced number of parts.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A control and drive system for controlling and driving a plurality of ultrasonic linear motors for driving automotive motor driven devices, each ultrasonic linear motor comprising an elastic vibratory member and vibration elements attached to the vibratory member, and capable of generating longitudinal and flexural vibrations in the vibratory member to generate a driving force in said vibratory member by combination of the longitudinal and flexural vibrations, for driving a respective automotive motor driven device, said control and drive system comprising:
   a power circuit connected through an ignition switch to the battery mounted on an automobile;
   a single ultrasonic oscillator connected to the power circuit for generating voltage signals having frequencies in the ultrasonic range;
   a plurality of power amplifiers each at least having one input terminal connected to the output terminal of the power circuit and at least one other input terminal connected to the output terminal of the ultrasonic oscillator, and having output terminals connected through motor control switches to the ultrasonic linear motors; and
   a control unit connected to the battery, the power circuit, the ultrasonic oscillator and the power amplifiers to control said plurality of ultrasonic linear motors.

* * * * *